T. T. PROSSER.
Improvement in Machines for Making Metallic Shoe-Pegs.
No. 116,219. Patented June 20, 1871.
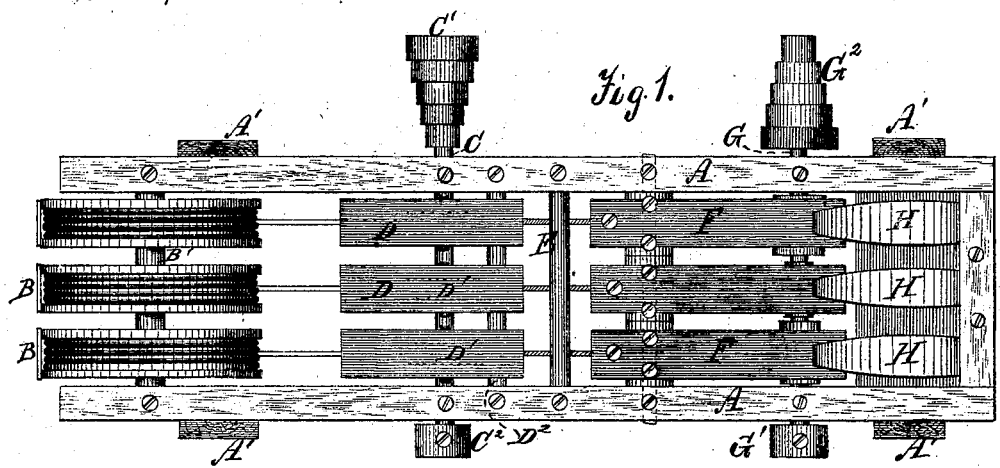
Fig. 1.
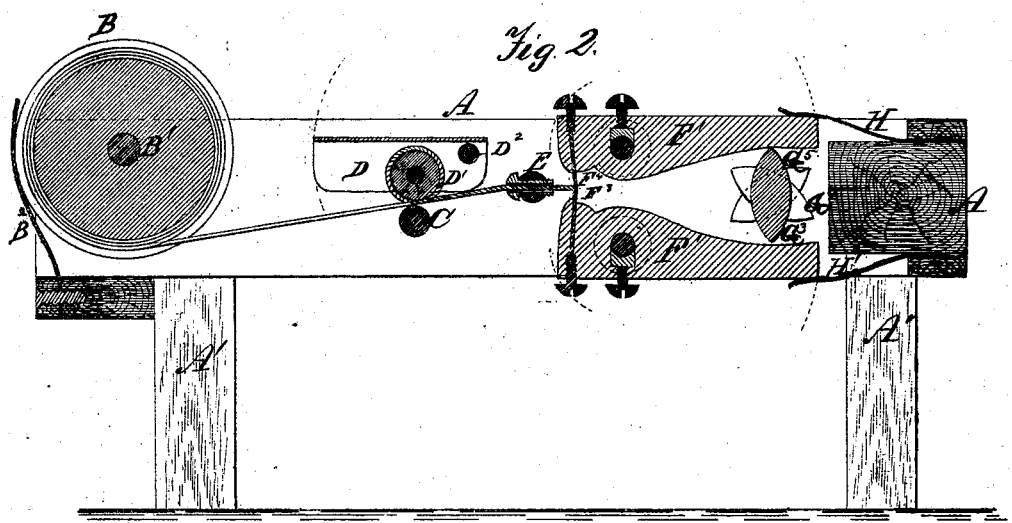
Fig. 2.
Fig. 3.
Witnesses.
A. Ruppert
T. T. Prosser
Inventor.
D. P. Holloway & Co
Attys

116,219

UNITED STATES PATENT OFFICE.

TREAT T. PROSSER, OF CHICAGO, ILLINOIS, ASSIGNOR TO HIMSELF, CHARLES E. RAMUS, OF LAWRENCE, KANSAS, AND HENRY WALLER, OF CHICAGO, ILLINOIS.

IMPROVEMENT IN MACHINES FOR MAKING METALLIC SHOE-PEGS.

Specification forming part of Letters Patent No. 116,219, dated June 20, 1871.

*To all whom it may concern:*

Be it known that I, TREAT T. PROSSER, of Chicago, in the county of Cook and State of Illinois, have invented certain Improvements in Machines for Making Metallic Shoe-Pegs; and I do hereby declare that the following is a full, clear, and exact description thereof, reference being had to the annexed drawing making part of this specification, in which—

Figure 1 is a plan view of my improved machine, showing the frame-work, the pulleys and shafts for driving it, the levers which carry the cutters, the weighted levers which hold the threaded wire in contact with the feed-rollers, and the reels upon which the wire is wound preparatory to being passed through this machine. Fig. 2 is a vertical sectional elevation, showing the cams which operate the cutters, the arrangement of such cutters in the levers which carry them, the guide which conducts the wire to the cutters, the feed-rollers, and the weighted lever, together with the spring which acts upon the reel. Fig. 3 is an elevation of one of the pegs as it appears after having been cut from the wire, its diameter having been enlarged for the purpose of showing the thread upon its surface and the form given to its ends by the act of cutting it from the wires.

Corresponding letters refer to corresponding parts in the several figures.

This invention relates to a machine for cutting metallic shoe-pegs, brads, and other similar devices from long pieces of wire or small rods of iron, upon which a screw-thread has been formed, or whose surface has been otherwise roughened or creased for the purpose of preventing such pegs or brads from being easily withdrawn from any substance in which it may have been driven, it being equally applicable to the cutting of smooth wire into lengths for any purpose; and it consists in the construction, combination, and arrangement of some of its parts, as will be more fully explained hereinafter.

In constructing machines of this character a frame-work, A A', made of wood or metal, is used, the form being that shown in the drawing, or any other that will receive and maintain in position the other parts of the machine. Near one end of this frame a shaft, $B^1$, is fixed in suitable bearings, which carries upon it a series of reels or drums, B B B, they being constructed with recesses or cavities in their peripheries to receive a coil of wire, as shown in the drawing, springs $B^2$ being provided to act upon them for the purpose of acting as a brake to prevent the too rapid movement of the reels or drums while the wire is being unwound from them. This wire having been previously prepared in another machine and wound upon these drums, which move freely upon the shaft, has one of its ends passed over a shaft, C, which shaft has its bearings in the sides of the frame A, and is furnished upon one of its ends with a cone of pulleys, $C^1$, for the purpose of giving to it by means of a belt different rates of speed, in order that pegs or brads of different lengths may be cut by the same machine. Upon the end of this shaft, which is opposite to the one upon which the cone is placed, there is affixed a pulley, $C^2$, which may be used as a driving-pulley. In order that the wire may be properly fed to the cutting mechanism weighted levers D D are pivoted to the frame A at $D^2$, they being provided with rollers $D^1$, which are so arranged within such levers that their centers are in a line vertically with that of the feeding-shaft C. The opposite ends of these levers D project beyond the shaft C sufficiently far to cause them to act as a weight upon the wire and press it down upon said shaft, so that as it is rotated at different rates of speed the wire will be more or less rapidly carried toward the cutters, and consequently as the relative speed of the cutters and the feeding mechanism is varied the length of the peg or brad cut will be varied. Another and a very important function which is performed by this feeding mechanism is that it permits or causes the forward movement of the wire to be arrested at the instant when the cutters are acting upon the wire, an operation which is of great importance to the successful working of the machine, as, if it were not for this provision, the wire would be bent or buckled between the feeding mechanism and the cutters at each closing together of such cutters, it being apparent that for the instant the movement of the wire must be arrested just at the time it is being cut.

The operation of this portion of the machine is as follows: The wire to be cut is passed between the shaft C and the milled roller $D^1$, and thence through a guide, E, as shown in Fig. 2, to the cutting mechanism. The shaft C having a continuous motion, it follows that the movement of the wire would be continuous were it not for the fact that the surface of the shaft which carries it forward is smooth, so that at the instant when the motion or movement of the wire is arrested by the closing of the knives upon it the shaft will slip upon the wire, and thus allow it to remain stationary for the instant, its onward movement, when the knives open, being secured by the weighted lever, which presses it down into contact with the shaft with sufficient force to insure such movement when not resisted by the operation above described. The guides E, above referred to, are for the purpose of keeping the wire in proper position with reference to the knives; and it consists in a shaft or bar of metal or of wood attached to the sides of the frame A, and having placed in it at proper intervals small metallic tubes, through which the wire passes, these tubes being so placed that they will hold the wire in about the center of the knives. They may, however, be made adjustable laterally, so as to guide the wire to any portion of the cutting-surface of the knives. For cutting the wire into pegs or brads there is pivoted to the frame a pair of levers, or a series in pairs, as shown in the drawing, the upper one or ones, $F^1$, being pivoted to the upper portion of the frame, while the lower one or ones are pivoted to the lower portion. These levers should be provided with a box or boxes, which enter them and surround or partially surround the shaft upon which they rotate, so that any wear which may occur at that point may be taken up, and thus their adjustment effected. The short arms of these levers are each provided with an adjustable knife, $F^3$ and $F^4$, they being so arranged as to cause their edges to be exactly in line, and so as to approach each other in closing so nearly as to sever the wire, and yet not permit the edges to be dulled by the contact. The opposite ends of these levers are to be of sufficient length to admit of their being operated upon by cams, as shown in Fig. 2, for the purpose of closing the knife-ends together. To operate the levers and knives above referred to a shaft, G, is journaled in the frame A in such a position that a cam or series of cams, $G^3$ $G^4$ $G^5$, placed thereon, shall be in position to open or press apart the long ends of the levers $F^1$ and $F^2$. Upon the outer end of this shaft there is placed a driving-pulley, $G^1$, over which a belt is to be passed for the purpose of giving motion to the machine, such motion being imparted from any prime mover. Upon the opposite end and outside of the frame there is placed a cone of pulleys, $G^2$, from which a belt may pass to the cone $C^1$ upon the feeding-shaft to give a variable motion to such shaft. To insure the opening or parting of the knives after the wire has been cut springs H H' are secured to the frame in such a manner as to bear upon the outer or longer ends of levers F $F^1$, as shown in Fig. 2, their action producing the desired result.

I have described my machine as consisting of a plurality of cutting devices, guides, and feeding-levers and rollers; but it is apparent that a machine may be constructed with only one of each without departing in any respect from the principle of operation herein set forth.

In Fig. 3 I have shown as nearly as possible the form of a peg or brad after it has been cut from the wire. It is proper to say that the form given to the ends of the pegs is due to the fact that the ends of the levers move through the arc of a circle, as shown by dotted lines in Fig. 2, and that as a consequence one end of the peg or brad is made to some extent wedge-shaped, which facilitates its entrance into the leather or wood or other substance in which it is used, while the concave form given to the opposite end facilitates the spreading thereof so as to form a head upon it when used as a brad or nail in any substance which is sufficiently hard to cause the proper amount of resistance in driving.

What I claim as my invention, and desire to secure by Letters Patent, is—

1. In a machine for severing shoe-pegs or brads from wire, the combination, with the cutters and the rotating feed-roll, of the grooved friction-roller and lever on which the friction-roller is located, substantially as and for the purpose set forth.

2. In combination with the subject-matter of the first clause of claim, the drum or reel B, substantially as and for the purpose set forth.

3. In combination with the subject-matter of the first clause, the levers F $F^1$, cam $G^3$, and springs H H', substantially as and for the purpose set forth.

In testimony whereof I have signed my name to this specification in the presence of two subscribing witnesses.

TREAT T. PROSSER.

Witnesses:
B. EDW. J. EILS,
A. RUPPERT.